United States Patent
Wakimoto

(10) Patent No.: US 12,431,564 B2
(45) Date of Patent: *Sep. 30, 2025

(54) BATTERY

(71) Applicant: SANYO Electric Co., Ltd., Osaka (JP)

(72) Inventor: Ryoichi Wakimoto, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 814 days.

This patent is subject to a terminal disclaimer.

(21) Appl. No.: 17/633,148

(22) PCT Filed: Jun. 23, 2020

(86) PCT No.: PCT/JP2020/024536
§ 371 (c)(1),
(2) Date: Feb. 4, 2022

(87) PCT Pub. No.: WO2021/024630
PCT Pub. Date: Feb. 11, 2021

(65) Prior Publication Data
US 2022/0302534 A1 Sep. 22, 2022

(30) Foreign Application Priority Data
Aug. 7, 2019 (JP) .................... 2019-145421

(51) Int. Cl.
*H01M 50/176* (2021.01)
*H01M 50/184* (2021.01)
(Continued)

(52) U.S. Cl.
CPC ....... *H01M 50/176* (2021.01); *H01M 50/184* (2021.01); *H01M 50/46* (2021.01);
(Continued)

(58) Field of Classification Search
CPC .. H01M 50/15; H01M 50/176; H01M 50/528; H01M 50/531; H01M 50/536;
(Continued)

(56) References Cited

U.S. PATENT DOCUMENTS

2018/0375162 A1 12/2018 Wakimoto et al.
2019/0006717 A1 1/2019 Wakimoto et al.
(Continued)

FOREIGN PATENT DOCUMENTS

CN 109326746 * 2/2019
CN 109326746 A 2/2019
(Continued)

OTHER PUBLICATIONS

International Search Report issued in International Patent Application No. PCT/JP2020/024536, dated Aug. 25, 2020, with English translation.
(Continued)

*Primary Examiner* — Brittany L Raymond
(74) *Attorney, Agent, or Firm* — Rimon P.C.

(57) ABSTRACT

A battery includes: an electrode body obtained by stacking a positive electrode plate and a negative electrode plate with a separator interposed therebetween, the positive electrode plate including a first positive electrode tab group; an exterior body having an opening and housing the electrode body; a sealing plate sealing the opening: a positive electrode terminal attached to the sealing plate; and a substantially plate-shaped positive electrode current collector arranged substantially parallel to the sealing plate between the electrode body and the sealing plate and electrically connected to the positive electrode terminal. A positive electrode tab group of the electrode body is welded to a surface of the positive electrode current collector facing the electrode body, and a second tape covers an area correspond-
(Continued)

ing to the back of a welding area of the positive electrode tab group on the surface of the positive electrode current collector facing the sealing plate.

5 Claims, 12 Drawing Sheets

(51) Int. Cl.
  *H01M 50/46* (2021.01)
  *H01M 50/528* (2021.01)
  *H01M 50/531* (2021.01)
  *H01M 50/543* (2021.01)
(52) U.S. Cl.
  CPC ....... *H01M 50/528* (2021.01); *H01M 50/531* (2021.01); *H01M 50/543* (2021.01)
(58) Field of Classification Search
  CPC ... H01M 50/543; H01M 50/547; H01M 50/55
  See application file for complete search history.

(56) References Cited

U.S. PATENT DOCUMENTS

| | | | |
|---|---|---|---|
| 2019/0140251 A1* | 5/2019 | Wakimoto | ............ H01M 50/55 |
| 2019/0171394 A1 | 6/2019 | Wakimoto et al. | |
| 2019/0181394 A1* | 6/2019 | Wakimoto | ........ H01M 10/0587 |
| 2021/0280952 A1 | 9/2021 | Wakimoto et al. | |
| 2022/0320695 A1 | 10/2022 | Wakimoto et al. | |

FOREIGN PATENT DOCUMENTS

| | | |
|---|---|---|
| CN | 109417154 A | 3/2019 |
| JP | 2009-87812 A | 4/2009 |
| JP | 2019-009015 A | 1/2019 |
| JP | 2019-012589 A | 1/2019 |
| JP | 2019-106274 A | 6/2019 |
| JP | 2019-145272 A | 8/2019 |

OTHER PUBLICATIONS

Extended European Search Report issued in corresponding European Patent Application No. 20850393, dated Aug. 31, 2022.
Chinese Office Action dated Dec. 4, 2023 issued in the related Chinese Patent Application No. 202080054554.3, with partial English translation.
Indian Office Action issued in corresponding Indian Patent Application No. 202247006845 on Jun. 6, 2022.

* cited by examiner

BATTERY

CROSS-REFERENCE OF RELATED APPLICATIONS

This application is the U.S. National Phase under 35 U.S.C. § 371 of International Patent Application No. PCT/JP2020/024536, filed on Jun. 23, 2020, which in turn claims the benefit of Japanese Application No. 2019-145421, filed on Aug. 7, 2019, the entire disclosures of which Applications are incorporated by reference herein.

TECHNICAL FIELD

The present invention relates to a battery.

BACKGROUND ART

Batteries such as alkaline secondary batteries and non-aqueous electrolyte secondary batteries are used for purposes such as driving power sources for electric vehicles (EV), hybrid electric vehicles (HEV), and plug-in hybrid electric vehicles (PHEV), and stationary rechargeable battery systems for reducing output fluctuations in solar or wind power generation, for example, and for peak-shifting grid power to be stored at night and used in the daytime.

A foreign object may be mixed into such a battery while being assembled. In particular, a metal foreign object mixed into a battery may cause an internal short circuit. The internal short circuit has the following mechanism.

First, adhering to a positive electrode material, a metal foreign object is, as metal ions, dissolved into an electrolyte by a high potential of the positive electrode. After reaching a negative electrode, the metal ions precipitate as a metal. The metal precipitates to grow toward the positive electrode, break through a separator, and come into contact with the positive electrode, thereby causing an internal short circuit.

Secondary batteries are usually assembled in a cleanroom to reduce foreign objects such as metal foreign objects mixed into the batteries. In addition, the metal foreign objects attached to an electrode body during the assembly are removed by air blowing, suction, magnetic force adsorption, or wiping with a polishing tape, for example.

Patent Document 1 suggests a sealed battery obtained by inserting an electrode body into a bag-shaped porous body, and inserting, into a sealed container, the porous body with the electrode body inserted thereinto.

CITATION LIST

Patent Document

Patent Document 1: Japanese Unexamined Patent Publication No. 2009-87812

SUMMARY OF THE INVENTION

Patent Document 1 fails to specifically describe any method or advantage of interposing the porous body between the electrode body and the lid of the sealed container. The specific method is unknown. In addition, the used porous body is a bag, which reduces the active material amount and the battery capacity.

In view of the foregoing background, it is an objective of the present invention to provide a battery capable of effectively reducing foreign objects mixed into an electrode body, without reducing the battery capacity.

A battery of the present invention includes: an electrode body obtained by stacking a positive electrode plate and a negative electrode plate with a separator interposed therebetween, at least one of the positive electrode plate or the negative electrode plate including a tab: an exterior body having an opening and housing the electrode body; a sealing plate sealing the opening; an external terminal attached to the sealing plate; and a substantially plate-shaped current collector arranged substantially parallel to the sealing plate between the electrode body and the sealing plate and electrically connected to the external terminal. The tab of the electrode body is welded to a surface of the current collector facing the electrode body, and a sealing plate-side covering member covers an area corresponding to the back of a welding area of the tab on a surface of the current collector facing the sealing plate.

Fixed to the sealing plate may be an internal insulation member having a flat area on a surface facing the electrode body. The current collector may include a first current collector substantially in a shape of a plate and a second current collector substantially in a shape of a plate, the first current collector including a first area and a second area closer to the electrode body than the first area on the surface facing the sealing plate, the second current collector being welded to the second area of the first collector. The second current collector may have a thickness set larger than the sum of a step between the first area and the second area of the first current collector and the thickness of the sealing plate-side covering member. The first area of the first current collector may be covered with the sealing plate-side covering member. A surface of the second current collector facing the sealing plate may abut on the flat area of the internal insulation member, whereas a surface of the second current collector facing the electrode body may abut on the second area of the first current collector.

An electrode body-side covering member may cover a welding point between the tab and the current collector.

A battery of the present invention may include: an electrode body obtained by stacking a positive electrode plate and a negative electrode plate with a separator interposed therebetween, the positive electrode plate including a positive electrode tab and the negative electrode plate including a negative electrode tab: an exterior body having an opening and housing the electrode body; a sealing plate sealing the opening; positive and negative terminals attached to the sealing plate; a substantially plate-shaped positive electrode current collector arranged substantially parallel to the sealing plate between the electrode body and the sealing plate and electrically connected to the positive electrode terminal; and a substantially plate-shaped negative electrode current collector arranged substantially parallel to the sealing plate between the electrode body and the sealing plate and electrically connected to the negative electrode terminal. The positive electrode tab of the electrode body may be welded to a surface of the positive electrode current collector facing the electrode body. The negative electrode tab of the electrode body may be welded to a surface of the negative electrode current collector facing the electrode body. A first sealing plate-side covering member may cover an area corresponding to the back of a welding area of the positive electrode tab on the surface of the positive electrode current collector facing the sealing plate. A second sealing plate-side covering member may cover an area corresponding to the back of a welding area of the negative electrode tab on the surface of the negative electrode current collector facing the sealing plate.

In the battery of the present invention, the area corresponding to the back of the welding area of the tab on the surface of the current collector facing the sealing plate is covered with the sealing plate-side covering member. This reduces the dust generated in the welding, adhering to the surface of the current collector facing the sealing plate, and entering the inside of the electrode body.

DESCRIPTION OF EMBODIMENT

Figure 1:
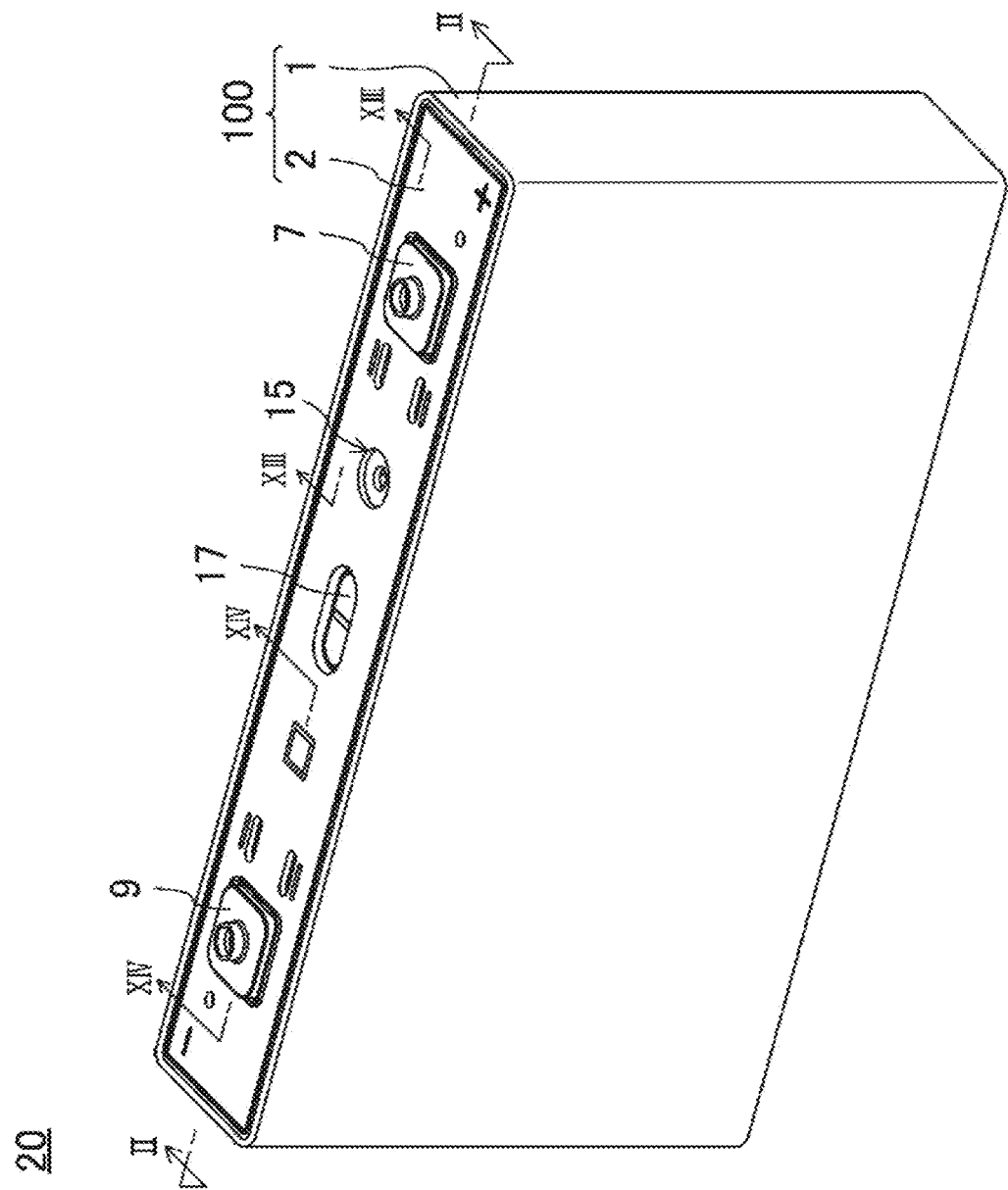
FIG. 1 is a perspective view of a secondary battery of an embodiment.

Hereinafter, an embodiment of the present invention will be described in detail with reference to the drawings. The following description of an advantageous embodiment is a mere example in nature, and is not at all intended to limit the scope, applications or use of the present invention. In the drawings below, constituent features substantially sharing the same function are denoted with the same reference sign for the sake of simplicity.

Embodiment

A configuration of a rectangular secondary battery 20 as a secondary battery of an embodiment will be described below. Note that the present invention is not limited to the following embodiment.

Figure 2:
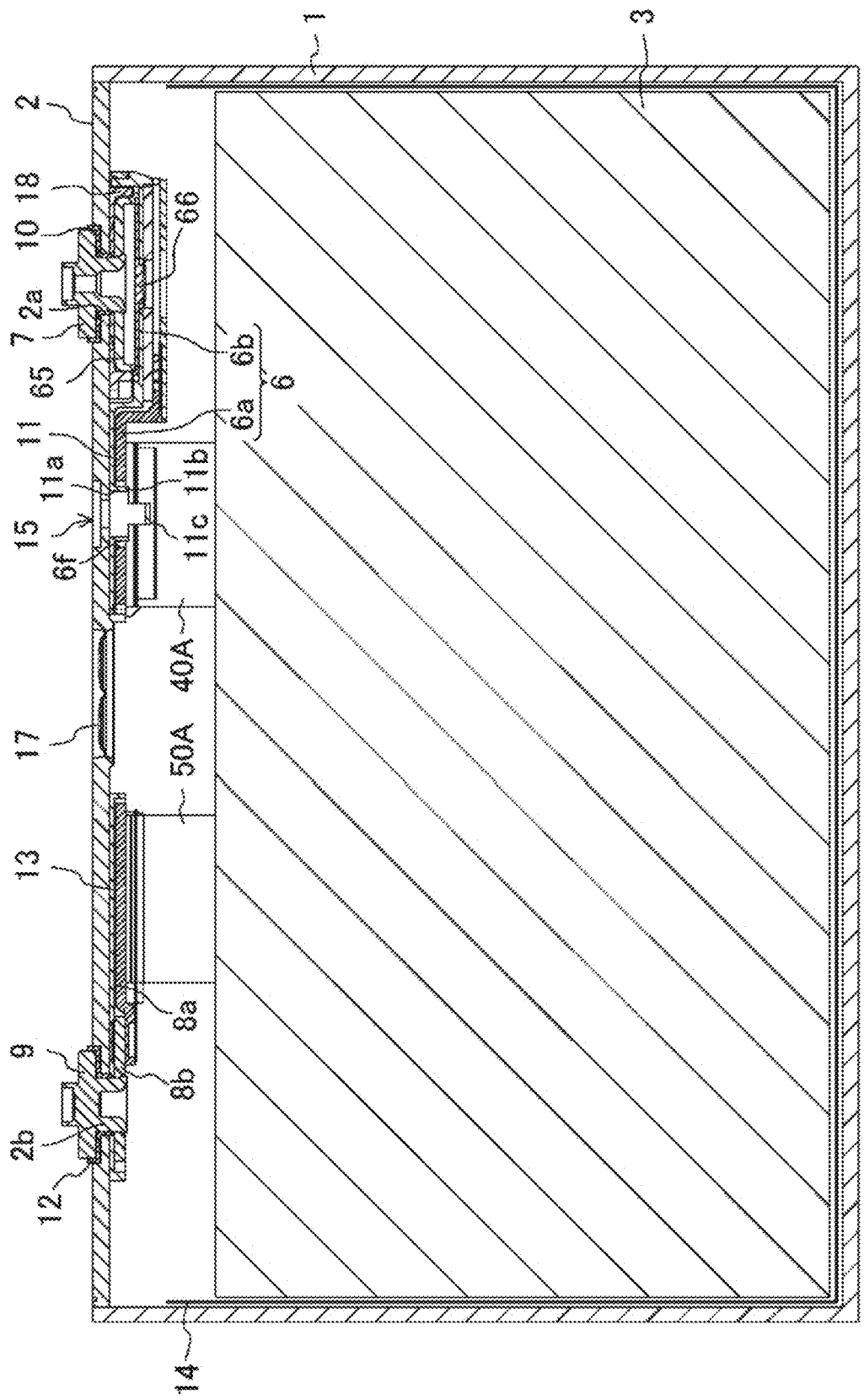
FIG. 2 is a cross-sectional view taken along line II-II in FIG. 1.

As shown in FIGS. 1 and 2, the rectangular secondary battery 20 includes a battery case 100 including a rectangular exterior body 1 and a sealing plate 2. The rectangular exterior body 1 is in the shape of a bottomed rectangular tube with an opening. The sealing plate 2 is in the shape of a substantially rectangular plate and seals the opening of the rectangular exterior body 1. Each of the rectangular exterior body 1 and the sealing plate 2 is made of metal, particularly, aluminum or an aluminum alloy in one preferred embodiment. The sealing plate 2 has, near respective longitudinal ends, a positive electrode terminal insertion hole 2a and a negative electrode terminal insertion hole 2b. The sealing plate 2 has, at a point closer to the positive electrode terminal insertion hole 2a than the longitudinal center, an electrolyte inlet 15 which is sealed by a sealing member (not shown) after injecting the electrolyte. The sealing plate 2 has, at the longitudinal center, a gas discharge valve 17 which is broken once the pressure inside the battery case 100 reaches a predetermined value or more to discharge the gas inside the battery case 100 outside the battery case 100.

Figure 3:
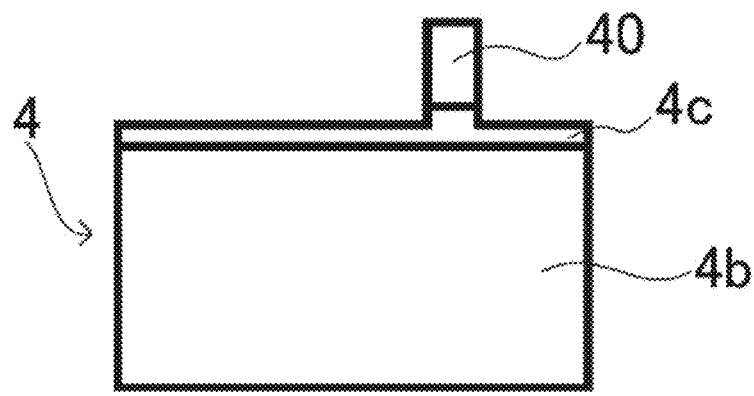
FIG. 3 is a plan view of a positive electrode plate.
Figure 4:
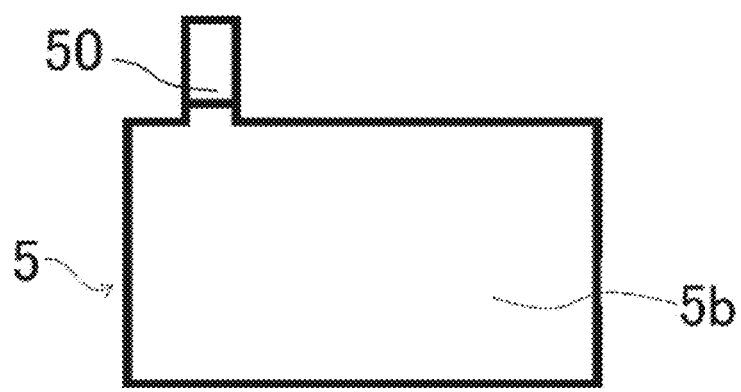
FIG. 4 is a plan view of a negative electrode plate.

The rectangular exterior body 1 houses an electrode body 3 obtained by stacking a positive electrode plate 4 shown in FIG. 3 and a negative electrode plate 5 shown in FIG. 4 with a separator interposed therebetween, together with an electrolyte. The positive electrode plate 4 has positive electrode tabs 40, whereas the negative electrode plate 5 has negative electrode tabs 50.

Figure 5:
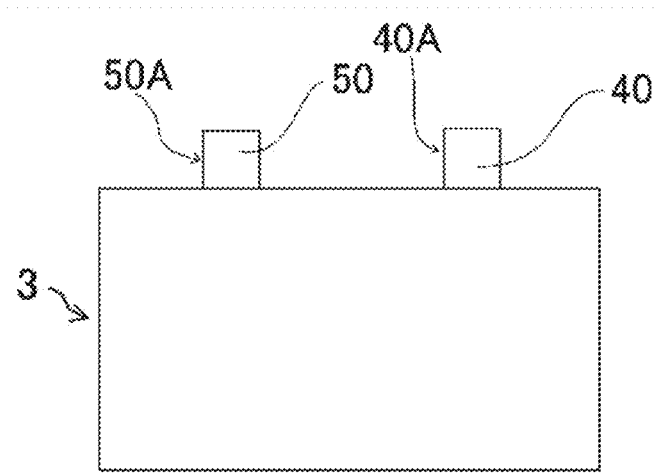
FIG. 5 is a plan view of an electrode body.

As shown in FIG. 5, the electrode body 3 includes, at the end at the sealing plate 2, positive and negative electrode tab groups 40A and 50A with a gap in the longitudinal direction of the sealing plate 2. The positive electrode tab group 40A includes the positive electrode tabs (tabs) 40 projecting toward the sealing plate 2. The negative electrode tab group 50A includes the negative electrode tabs (tabs) 50 projecting toward the sealing plate 2. The positive electrode tab group 40A is electrically connected to a positive electrode terminal 7 via a first positive electrode current collector 6a and a second positive electrode current collector 6b. The negative electrode tab group 50A is electrically connected to a negative electrode terminal 9 via a first negative electrode current collector 8a and a second negative electrode current collector 8b.

Figure 8:
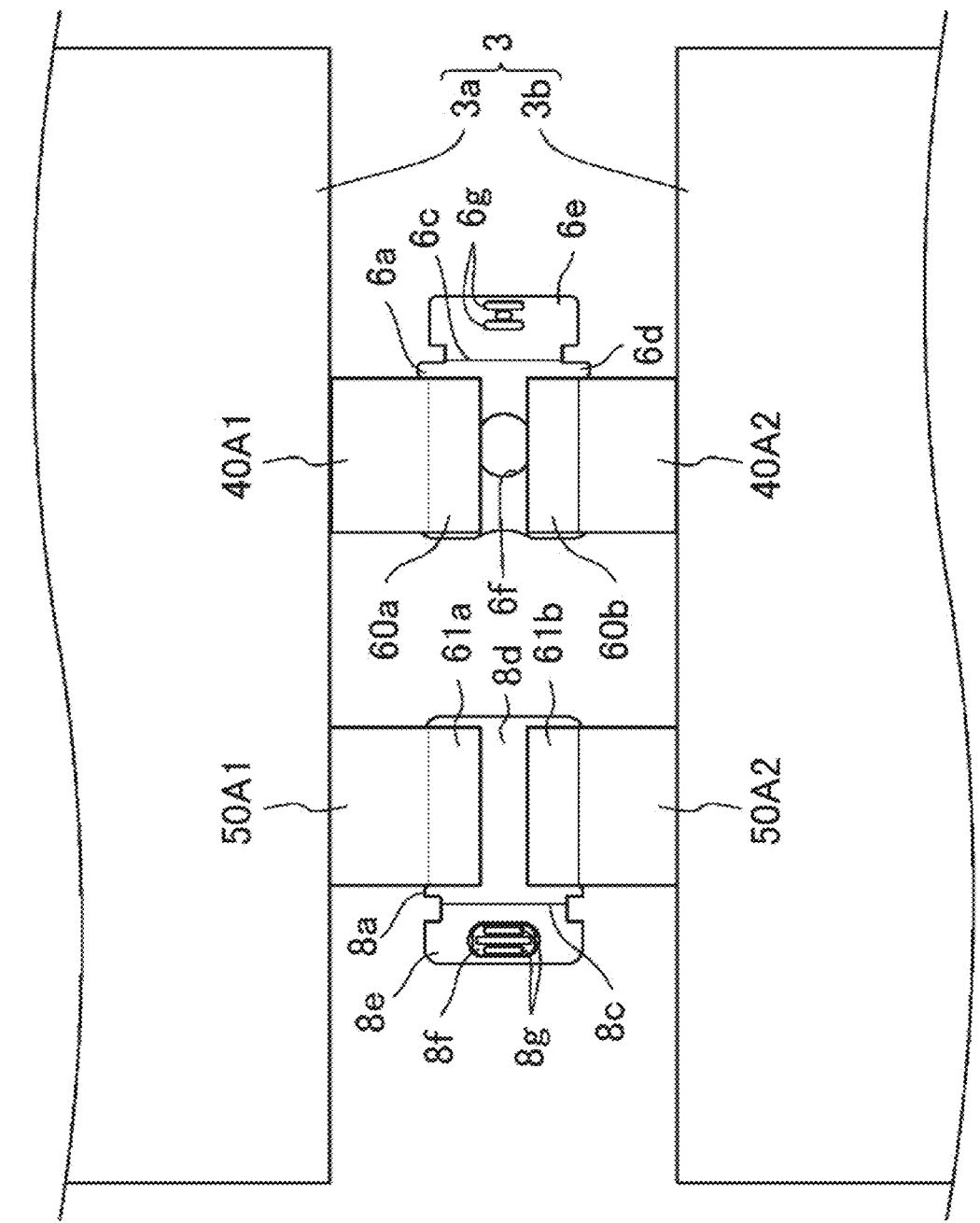
FIG. 8 shows that a positive electrode tab group is connected to the first positive electrode current collector, and a negative electrode tab group is connected to the first negative electrode current collector.

As shown in FIG. 8, the electrode body 3 includes first and second electrode body elements 3a and 3b, each obtained by stacking positive and negative electrode plates 4 and 5 with a separator interposed therebetween. These two electrode body elements 3a and 3b have the same structure. The first electrode body element 3a includes a first positive electrode tab group 40A1 and a first negative electrode tab group 50A1. The second electrode body element 3b includes a second positive electrode tab group 40A2 and a second negative electrode tab group 50A2.

Figure 6:
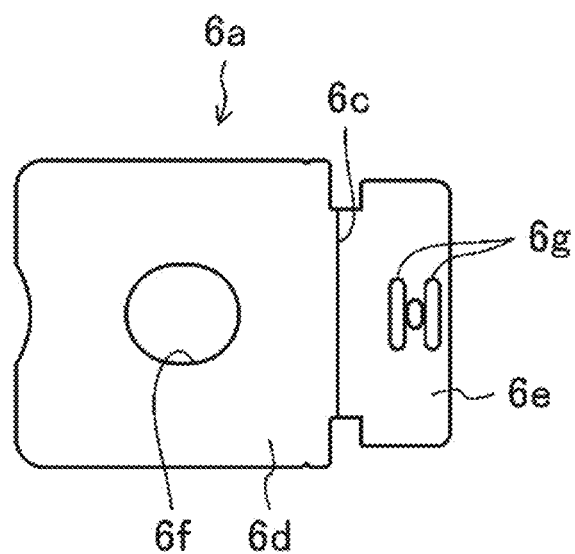
FIG. 6 is a plan view of a first positive electrode current collector (positive electrode current collector).
Figure 13:
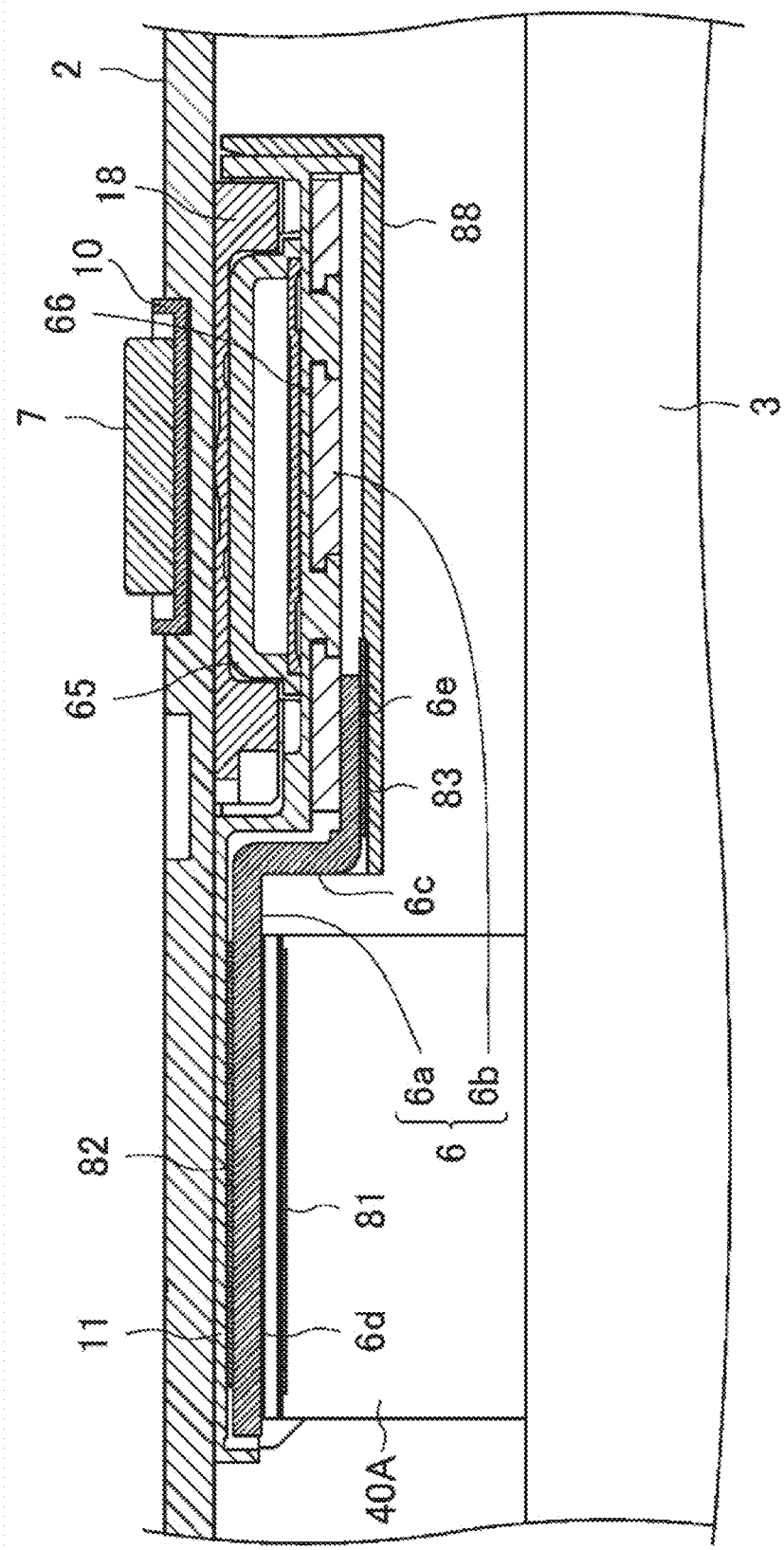
FIG. 13 is a cross-sectional view taken along line XIII-XIII in FIG. 1.

As shown in FIGS. 6 and 13, the first positive electrode current collector 6a is in the shape of a plate substantially parallel to the sealing plate 2. Specifically, the first positive electrode current collector 6a includes a step 6c near one end (the end farther from the negative electrode terminal 9) in the longitudinal direction of the sealing plate 2. The area closer to the other end in the longitudinal direction of the sealing plate 2 than the step 6c serves as a main plate 6d. The area closer to the one end in the longitudinal direction of the sealing plate 2 than the step 6c serves an electrode body-side plate 6e closer to the electrode body 3 than the main plate 6d. The main plate 6d has a current collector through-hole 6f to face the electrolyte inlet 15 of the sealing plate 2. The electrode body-side plate 6e has thin parts 6g.

The second positive electrode current collector 6b is in the shape of a plate substantially parallel to the sealing plate 2.

The thin parts 6g of the electrode body-side plate 6e of the first positive electrode current collector 6a are integrally welded to the second positive electrode current collector 6b from the electrode body 3 side. The first and second positive electrode current collectors 6a and 6b form the positive electrode current collector 6.

The first and second positive electrode current collectors 6a and 6b and the positive electrode terminal 7 are made of metal, particularly, aluminum or an aluminum alloy in one preferred embodiment.

Interposed between the positive electrode terminal 7 and the sealing plate 2 is an external insulation member 10 of a resin. A first internal insulation member 18 is located inside the battery (closer to the electrode body 3) around the positive electrode terminal insertion hole 2a of the sealing plate 2. The first internal insulation member 18 abuts on the sealing plate 2 from the inside of the battery. Each of the external insulation member 10 and the first internal insulation member 18 has, in the point corresponding to the positive electrode terminal insertion hole 2a of the sealing plate 2, a through-hole for inserting the positive electrode terminal 7. A cup-shaped conductive member 65 is located in the first internal insulation member 18 inside the battery (closer to the electrode body 3) with its opening oriented inside the battery. The conductive member 65 has a terminal connection hole penetrating therethrough. In the conductive member 65 inside the battery, a disk-shaped deformable plate 66 closes the opening of the conductive member 65. The peripheral edge of the deformable plate 66 is welded and connected to the conductive member 65 to seal the opening of the conductive member 65. Each of the conductive member 65 and the deformable plate 66 is made of metal, particularly, aluminum or an aluminum alloy in one preferred embodiment.

Interposed between the first and second positive electrode current collectors 6a and 6b and the sealing plate 2 is a second internal insulation member 11 of a resin. The second internal insulation member 11 abuts on the periphery of the electrolyte inlet 15 of the sealing plate 2 and the deformable plate 66 from the inside of the battery. The second internal insulation member 11 has a liquid injection opening 11a to face the electrolyte inlet 15 of the sealing plate 2. The second internal insulation member 11 has, at the edge of the liquid injection opening 11a, a tube 11b projecting toward the inside of the battery. The second internal insulation member 11 further includes an opening cover 11c projecting from two points on the edge of the tube 11b toward the inside of the battery to connect the two points like a bridge. The second internal insulation member 11 further has a through-hole partially overlapping the deformable plate 66.

Figure 11:
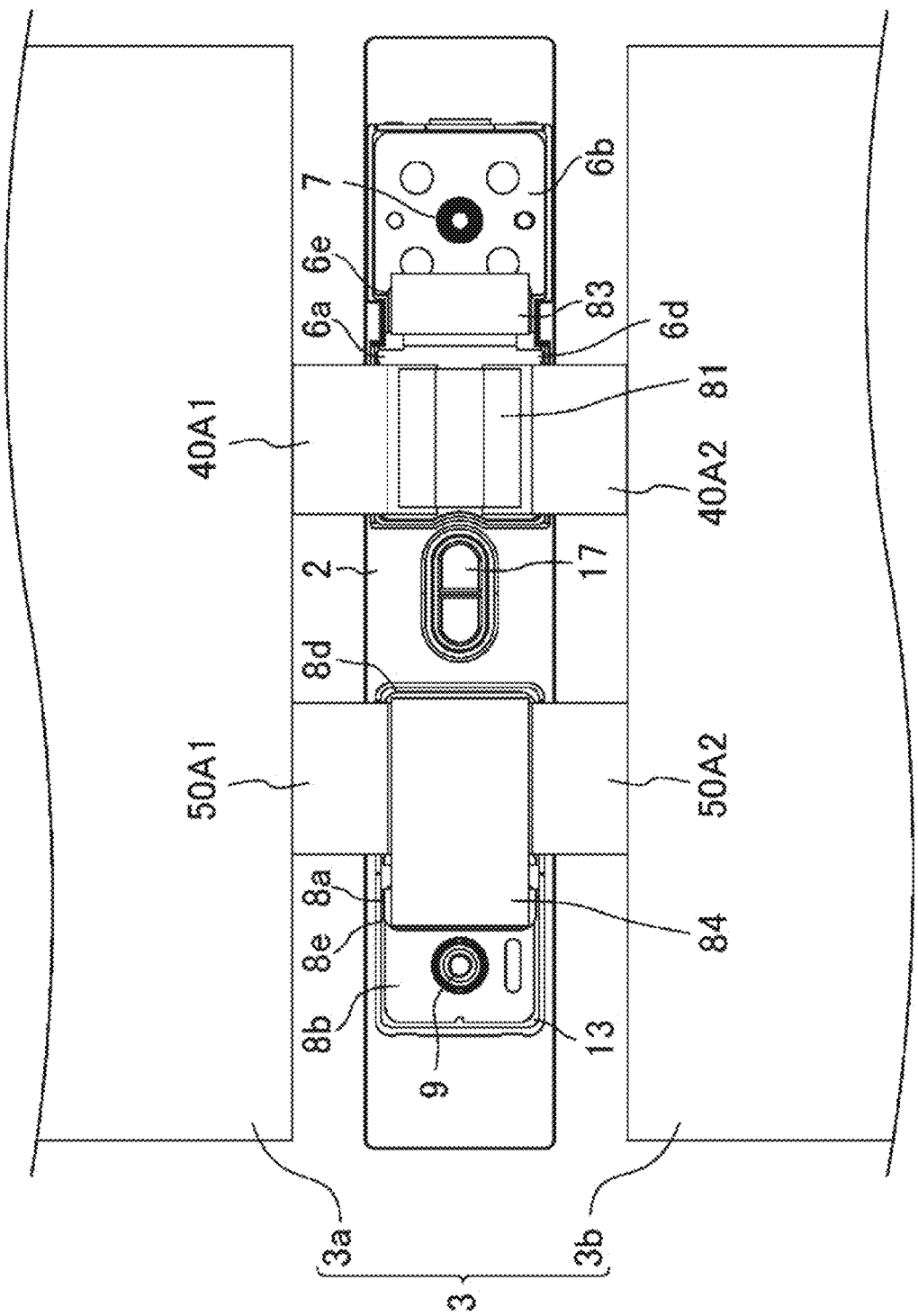
FIG. 11 corresponds to FIG. 10 with first, third, and fourth tapes attached.

As shown in FIG. 8, the distal ends of the first and second positive electrode tab groups 40A1 and 40A2 are welded to two areas sandwiching the current collector through-hole 6f from both sides in the transverse direction of the sealing plate 2 on the surface of the main plate 6d of the first positive electrode current collector 6a facing the electrode body 3. That is, the welding areas at the distal ends of the first and second positive electrode tab groups 40A1 and 40A2 are spaced apart from each other in the transverse direction of the sealing plate 2 with the current collector through-hole 6f interposed therebetween. In FIG. 8, reference character 60a denotes the distal end, that is, the welding point of the first positive electrode tab group 40A1, whereas reference character 60b denotes the distal end, that is, the welding point of the second positive electrode tab group 40A2. As shown in FIG. 11, the welding points 60a and 60b of the first and second positive electrode tab groups 40A1 and 40A2, and the area sandwiched between the welding points 60a and 60b on the surface of the first positive electrode current collector 6a facing the electrode body 3 from two sides in the transverse direction of the sealing plate 2 is covered with a first tape 81 as the electrode body-side covering member from the electrode body 3 side. The two ends of the first tape 81 in the transverse direction of the sealing plate 2 are applied to the welding points 60a and 60b of the first and second positive electrode tab groups 40A1 and 40A2. On the other hand, a gap is interposed between an intermediate portion of the first tape 81 in the transverse direction of the sealing plate 2 and each of the current collector through-hole 6f of the first positive electrode current collector 6a, the liquid injection opening 11a and the opening cover 11c of the second internal insulation member 11, and the electrolyte inlet 15 of the sealing plate 2.

Figure 15:
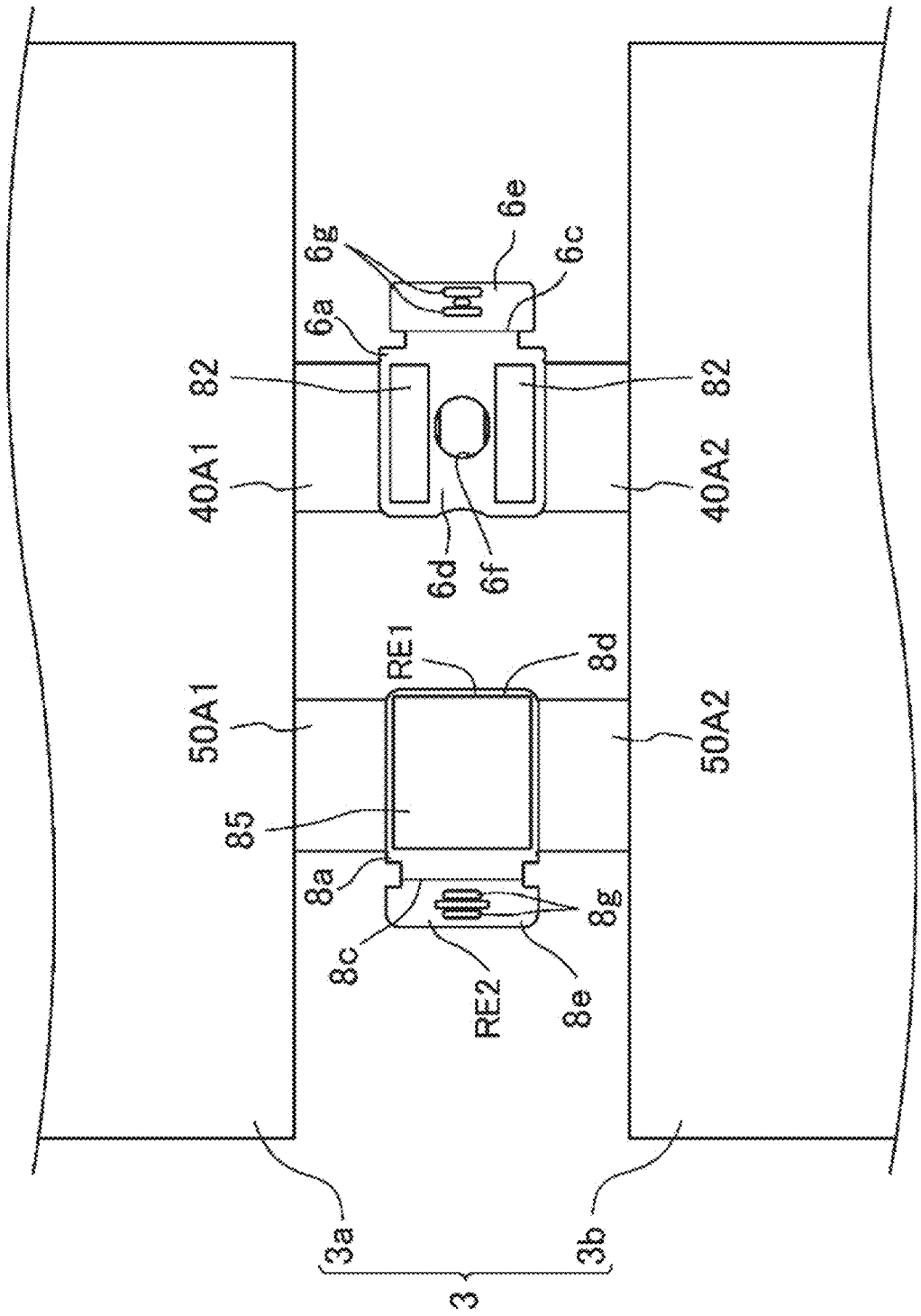
FIG. 15 corresponds to FIG. 8 with second and fifth tapes attached.

As shown in FIG. 15, on the surface of the main plate 6d of the first positive electrode current collector 6a facing the sealing plate 2, the areas corresponding to the back of the welded area of the first and second positive electrode tab groups 40A1 and 40A2 are covered with second tapes 82 as rectangular sealing plate-side covering members. The whole second tapes 82 are applied to the first positive electrode current collector 6a.

Applied to the electrode body-side plate 6e of the first positive electrode current collector 6a from the electrode body 3 side is a third tape 83 to cover the welding point between the first and second positive electrode current collectors 6a and 6b.

Figure 7:
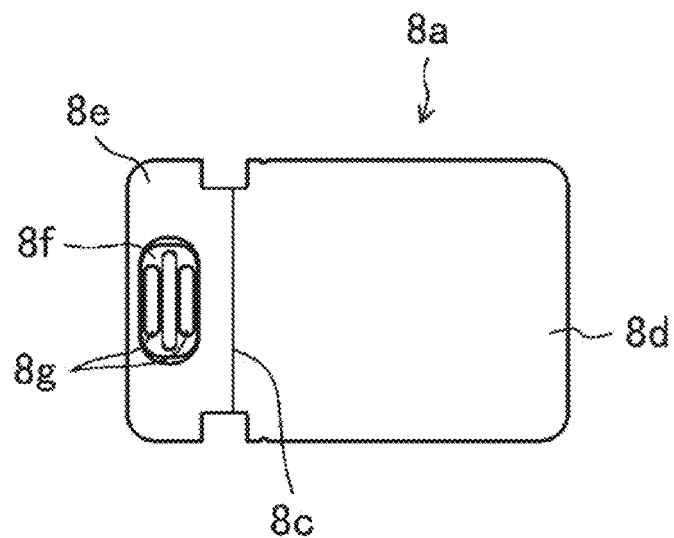
FIG. 7 is a plan view of a first negative electrode current collector (negative electrode current collector).
Figure 14:
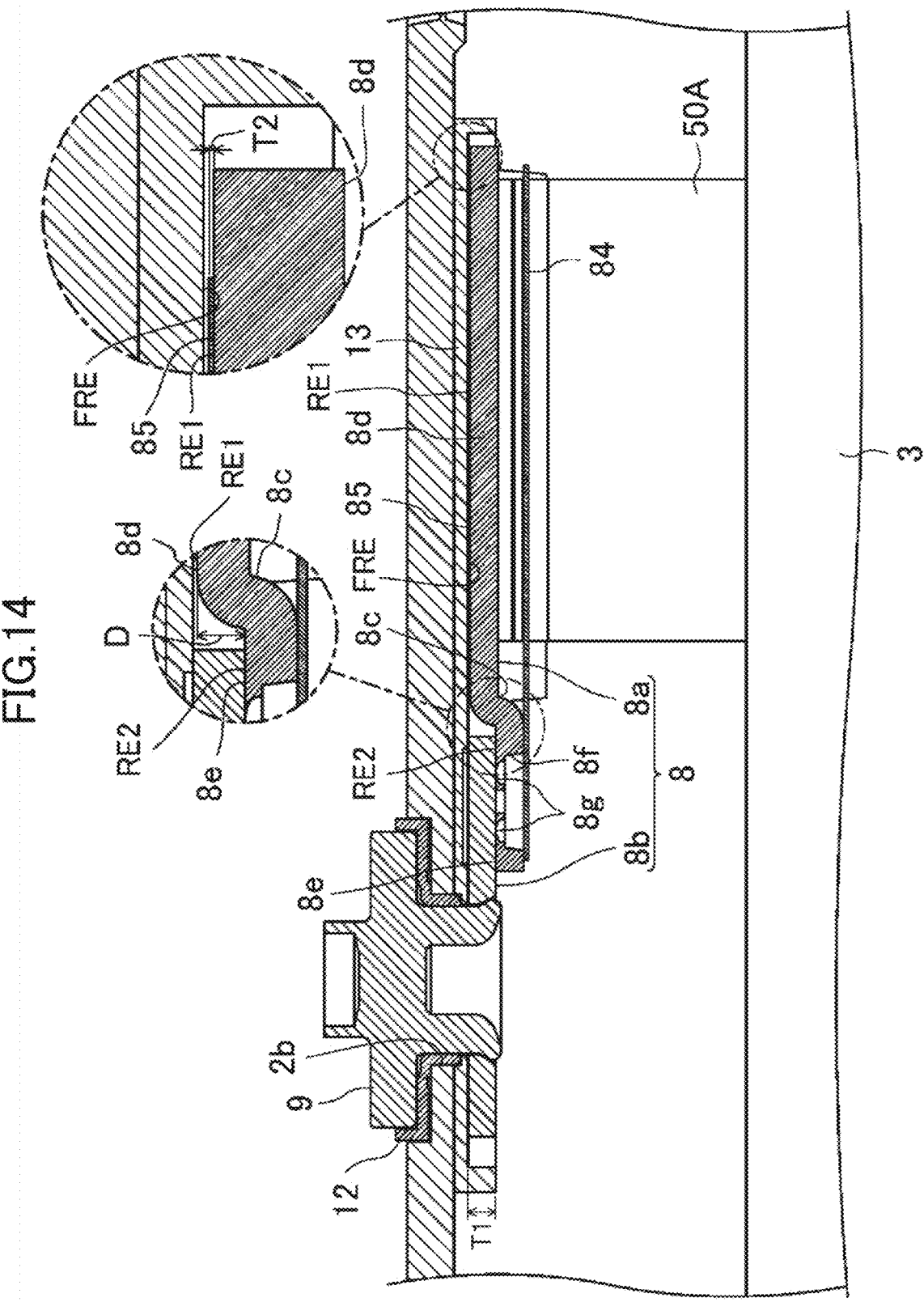
FIG. 14 is a cross-sectional view taken along line XIV-XIV in FIG. 1.

As shown in FIGS. 7 and 14, the first negative electrode current collector 8a is in the shape of a plate substantially parallel to the sealing plate 2. Specifically, the first negative electrode current collector 8a includes a step 8c near one end (the end farther from the positive electrode terminal 7) in the longitudinal direction of the sealing plate 2. The area closer to the other end in the longitudinal direction of the sealing plate 2 than the step 8c serves as a first plate 8d. The area closer to the one end in the longitudinal direction of the sealing plate 2 than the step 8c serves a second plate 8e closer to the electrode body 3 than the first plate 8d. The surface of the first plate 8d facing the sealing plate 2 serves as a first area RE1, whereas the surface of the second plate 8e facing the sealing plate 2 serves as a second area RE2 which is closer to the electrode body 3 than the first area RE1 is. In FIG. 14, reference character D denotes the step between the first and second areas RE1 and RE2. The second plate 8e has, on the surface facing the electrode body 3, a recess 8f toward the sealing plate 2. The recess 8f has thin parts 8g.

The second negative electrode current collector 8b is in the shape of a plate substantially parallel to the sealing plate 2. The second negative electrode current collector 8b has a terminal connection hole. In FIG. 14, reference character T1 denotes the thickness of the second negative electrode current collector 8b.

The second negative electrode current collector 8b is integrally welded to the thin parts 8g (i.e., the second area RE) of the second plate 8e of the first negative electrode current collector 8a. The surface of the second negative electrode current collector 8b facing the electrode body 3 abuts on the second area RE2 of the first negative electrode current collector 8a. The first and second negative electrode current collectors 8a and 8b form a negative electrode current collector 8.

The first and second negative electrode current collectors 8a and 8b and the negative electrode terminal 9 are made of metal, particularly, copper or a copper alloy in one preferred embodiment. The negative electrode terminal 9 has a part made of aluminum or an aluminum alloy, and a part made of copper or a copper alloy in one preferred embodiment. In this case, the part made of copper or a copper alloy is connected to the second negative electrode current collector 8b, and the part made of aluminum or an aluminum alloy projects outward beyond the sealing plate 2 in one preferred embodiment.

Interposed between the negative electrode terminal 9 and the sealing plate 2 is an external insulation member 12 of a resin. Interposed between the first and second negative electrode current collectors 8a and 8b and the sealing plate 2 is an internal insulation member 13 of a resin. The internal insulation member 13 is fixed while abutting on the sealing plate 2 from the inside of the battery. Each of the external insulation member 12 and the internal insulation member 13 has a through-hole in the point corresponding to the negative electrode terminal insertion hole 2b of the sealing plate 2.

The surface of the internal insulation member 13 facing the electrode body 3 has a flat area FRE. Abutting on the flat area FRE is the surface of the second negative electrode current collector 8b facing the sealing plate 2.

The distal ends of the first and second negative electrode tab groups 50A1 and 50A2 are welded to the surface of the first plate 8d of the first negative electrode current collector 8a facing the electrode body 3. That is, the welding areas at the distal ends of the first and second negative electrode tab groups 50A1 and 50A2 are spaced apart from each other in the transverse direction of the sealing plate 2. In FIG. 8, reference character 61a denotes the distal end, that is, the welding point of the first negative electrode tab group 50A1, whereas reference character 61b denotes the distal end, that is, the welding point of the second negative electrode tab group 50A2. The distal ends, that are, the welding points 61a and 61b of the first and second negative electrode tab groups 50A1 and 50A2, the area sandwiched between the welding points 61a and 61b on the surface of the first plate 8d facing the electrode body 3 from two sides in the transverse direction of the sealing plate 2, and the welding point of the second plate 8e to the second negative electrode current collector 8b are covered with a single fourth tape 84 as an electrode body-side covering member from the electrode body 3 side. The fourth tape 84 is applied to the welding points 61a and 61b of the first and second negative electrode tab groups 50A1 and 50A2 and the area of the second plate 8e other than the recess 8f.

Applied to the surface of the first plate 8d of the first negative electrode current collector 8a facing the sealing plate 2, that is, the first area RE1 is a single fifth tape 85 as a sealing plate-side covering member across the entire area except the peripheral end thereof. This fifth tape 85 covers two areas corresponding to the back of the welding areas of the first and second negative electrode tab groups 50A1 and 50A2 on the surface (i.e., the first area RE1) of the first plate 8d of the first negative electrode current collector 8a facing the sealing plate 2.

Each of the first to fifth tapes 81 to 85 includes a base material that is a polypropylene film, and an adhesive layer made of a rubber-based adhesive applied to one surface of the polypropylene film. The first to fifth tapes 81 to 85 have the thickness set equal to each other. In FIG. 14, reference character T2 denotes the thickness of the fifth tape 85. The thickness T1 of the second negative electrode current collector 8b is set larger than the sum of the step D between the first and second areas RE1 and RE2 of the first negative electrode current collector 8a and the thickness T2 of the fifth tape 85.

Interposed between the electrode body 3 and the rectangular exterior body 1 is an electrode body holder 14 that is a resin sheet. A resin insulation sheet is folded and molded into a bag or a box as the electrode body holder 14 in one preferred embodiment. This electrode body holder 14 reliably keeps the electrode body 3 and the rectangular exterior body 1 electrically insulated from each other.

Now, the details of a production method and components of the rectangular secondary battery 20 will be described.

[Positive Electrode Plate]

First, a method of producing the positive electrode plate 4 will be described.

[Preparation of Slurry for Positive Electrode Active Material Mixture Layer]

A slurry for a positive electrode active material mixture layer is prepared by kneading a positive electrode active material, a conductive agent, and a binder, for example. Examples of the positive electrode active material include lithium composite oxides such as lithium nickel cobalt manganese composite oxides. Examples of the binder include fluorine resins such as polyvinylidene fluoride (PVdF). Examples of the conductive agent include carbon materials such as carbon black.

[Preparation of Slurry for Positive Electrode Protective Layer]

Alumina powder, graphite as a conductive agent, polyvinylidene fluoride (PVdF) as a binder, N-methyl-2-pyrrolidone (NMP) as a dispersion medium are kneaded into a slurry for a protective layer.

[Formation of Positive Electrode Active Material Mixture Layer and Positive Electrode Protective Layer]

The slurries for the positive electrode active material mixture layer and the positive electrode protective layer prepared as described above are applied to both sides of an aluminum foil as a positive electrode core with a thickness of 15 µm by a die coater. The slurry for the positive electrode protective layer is applied to at least one transverse end of an area applied with the slurry of the positive electrode active material mixture layer.

The positive electrode core applied with the slurries for the positive electrode active material mixture layer and the positive electrode protective layer is dried to remove NMP inside the slurry. Accordingly, the positive electrode active material mixture layer and the protective layer are formed. After that, the positive electrode active material mixture layer passes between a pair of press rollers so as to be compressed into a positive electrode original plate. This positive electrode original plate is cut into a predetermined size as the positive electrode plate 4 shown in FIG. 3. The positive electrode plate 4 has a rectangular shape with an upper side from which the positive electrode tabs 40 project. The positive electrode plate 4 includes a narrow positive electrode protective layer 4c along the upper side, and a positive electrode active material mixture layer 4b from the bottom of the positive electrode protective layer 4c to the lower side of the positive electrode plate 4. As described above, the positive electrode tabs 40 may be formed from the positive electrode core, or another member may be connected to the positive electrode plate 4 to serve as the positive electrode tabs 40.

[Negative Electrode Plate]

Next, a method of producing the negative electrode plate 5 will be described.

[Preparation of Slurry for Negative Electrode Active Material Mixture Layer]

A slurry for a negative electrode active material mixture layer is prepared by kneading a negative electrode active material, a conductive agent, a binder, and a thickener. Examples of the negative electrode active material include carbon materials such as graphite. Examples of the binder include styrene butadiene rubber (SBR). Examples of the thickener include carboxymethyl cellulose (CMC).

[Formation of Negative Electrode Active Material Mixture Layer]

The slurry for the negative electrode active material mixture layer prepared as described above is applied to both sides of a copper foil as a negative electrode core with a thickness of 8 μm by a die coater.

The negative electrode core applied with the slurry for the negative electrode active material mixture layer is dried to remove water inside the slurry. Accordingly, the negative electrode active material mixture layer is formed. After that, the negative electrode active material mixture layer passes between a pair of press rollers so as to be compressed into a negative electrode original plate. This negative electrode original plate is cut into a predetermined size as the negative electrode plate 5 shown in FIG. 4. The negative electrode plate 5 has a rectangular shape with an upper side from which the negative electrode tabs 50 project. Accordingly, the negative electrode active material mixture layer 5*b* is formed on the entire surface of the negative electrode core except the negative electrode tabs 50. As described above, the negative electrode tabs 50 may be formed from the negative electrode core, or another member may be connected to the negative electrode plate 5 to serve as the negative electrode tabs 50.

[Preparation of Electrode Body]

The positive and negative electrode plates 4 and 5 prepared as described above are stacked one on the other with a separator interposed therebetween to obtain the multilayer electrode body 3. The numbers of the positive and negative electrode plates 4 and 5 included in the electrode body 3 are not particularly limited but may be tens or more in one preferred embodiment. Specifically, the first and second electrode body elements 3*a* and 3*b* are prepared as the electrode body 3.

[Connection Between Current Collectors and Tabs]

As shown in FIG. 8, the first positive electrode tab group 40A1 of the first electrode body element 3*a* and the second positive electrode tab group 40A2 of the second electrode body element 3*b* are welded to one surface of the main plate 6*d* of the first positive electrode current collector 6*a* (positive electrode current collector 6) shown in FIG. 6. The first negative electrode tab group 50A1 of the first electrode body element 3*a* and the second negative electrode tab group 50A2 of the second electrode body element 3*b* are welded to one surface of the first plate 8*d* of the first negative electrode current collector 8*a* (negative electrode current collector 8) shown in FIG. 7.

The welding connection between the positive electrode tab group 40A and the first positive electrode current collector 6*a* and between the negative electrode tab group 50A and the first negative electrode current collector 8*a* are made by ultrasonic welding, resistance welding, or laser welding, for example. In this embodiment, the welding connection is made by ultrasonic welding.

After that, as shown in FIG. 15, two second tapes 82 are applied to the other surface of the main plate 6*d* of the first positive electrode current collector 6*a*, and the fifth tape 85 is applied to the other surface of the first plate 8*d* of the first negative electrode current collector 8*a*. Accordingly, the second tapes 82 capture the foreign objects adhering to the surface of the first positive electrode current collector 6*a* farther from the surface connected to the positive electrode tab group 40A, particularly the metal powder generated in the welding process of the positive electrode tab group 40A not to cause the foreign objects to enter the inside of the electrode body 3. Similarly, the fifth tape 85 captures the foreign objects adhering to the surface of the first negative electrode current collector 8*a* farther from the surface connected to the negative electrode tab group 50A, particularly the metal powder generated in the welding process of the negative electrode tab group 50A not to cause the foreign objects to enter the inside of the electrode body 3. This largely reduces the internal short circuits caused by the foreign objects.

[Attachment of Components to Sealing Plate]

Figure 9:
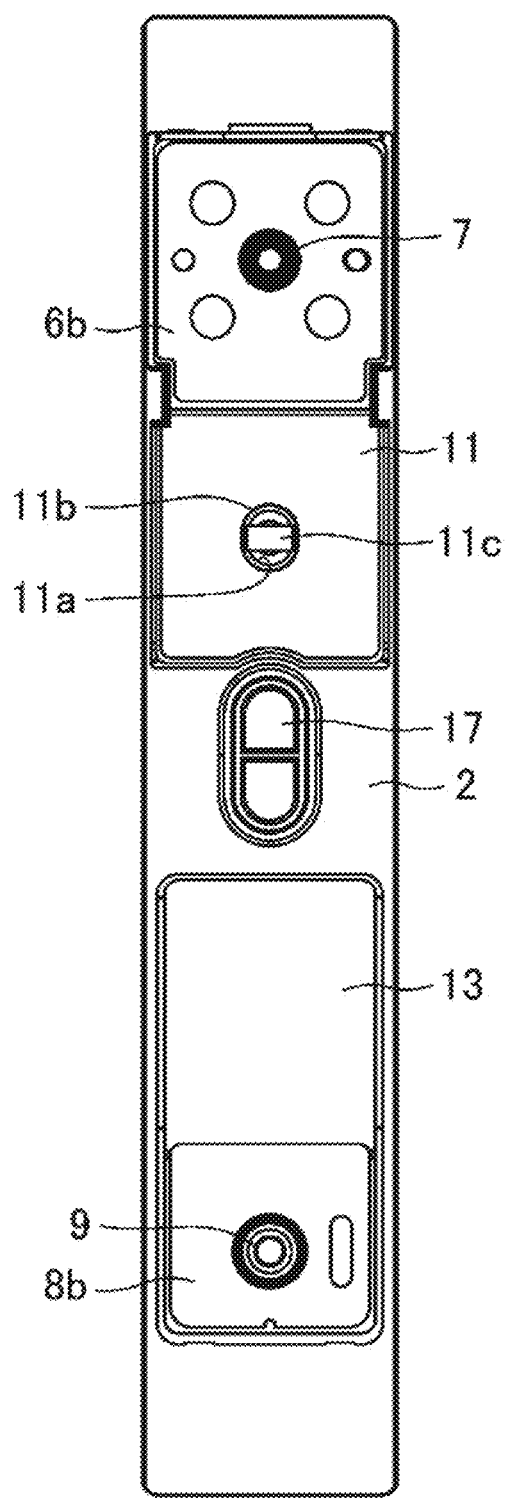
FIG. 9 shows the surface of a sealing plate facing the electrode body after attaching second positive and negative electrode current collectors.

FIG. 9 shows the surface of the sealing plate 2 facing the inside of the battery and attached with the components. The attachment of the components to the sealing plate 2 will be described with reference to FIGS. 2 and 9.

The external insulation member 10 surrounds a positive electrode terminal insertion hole 2*a* of the sealing plate 2. The first internal insulation member 18 and the cup-shaped conductive member 65 are arranged on the inner surface of the battery around the positive electrode terminal insertion hole 2*a* of the sealing plate 2. The positive electrode terminal 7 is then inserted from the outside of the battery through the through-hole of the external insulation member 10, the positive electrode terminal insertion hole 2*a* of the sealing plate 2, the through-hole of the first internal insulation member 18, and a terminal connection hole of the conductive member 65. The tip of the positive electrode terminal 7 is crimped onto the conductive member 65. As a result, the positive electrode terminal 7 and the conductive member 65 are fixed to the sealing plate 2. The crimped part of the positive electrode terminal 7 and the conductive member 65 are welded and connected in one preferred embodiment.

The disk-shaped deformable plate 66 closes the opening of the conductive member 65, and has a peripheral edge welded and connected to the conductive member 65. Accordingly, the opening of the conductive member 65 is sealed. Next, the second internal insulation member 11 of a resin is located on the periphery of the electrolyte inlet 15 of the sealing plate 2 and the side of the deformable plate 66 closer to the electrode body 3. Then, the second positive electrode current collector 6*b* is placed inside the battery with respect to the second internal insulation member 11, and the deformable plate 66 and the second positive electrode current collector 6*b* are welded and connected through the through-hole of the second internal insulation member 11.

On the other hand, the external insulation member 12 is placed on the outer surface of the battery around the negative electrode terminal insertion hole 2*b* of the sealing plate 2. The internal insulation member 13 and the second negative electrode current collector 8*b* are arranged on the inner surface of the battery around the negative electrode terminal insertion hole 2*b* of the sealing plate 2. The negative electrode terminal 9 is then inserted from the outside of the battery through the through-hole of the external insulation member 12, the negative electrode terminal insertion hole 2*b* of the sealing plate 2, the through-hole of the internal insulation member 13, and the terminal connection hole of the second negative electrode current collector 8*b*. The tip of the negative electrode terminal 9 is crimped onto the second negative electrode current collector 8*b*. As a result, the negative electrode terminal 9 and the second negative electrode current collector 8*b* are fixed to the sealing plate 2. The crimped part of the negative electrode terminal 9 and the second negative electrode current collector 8*b* are welded and connected in one preferred embodiment.

[Connection between First and Second Current Collectors]

Figure 10:
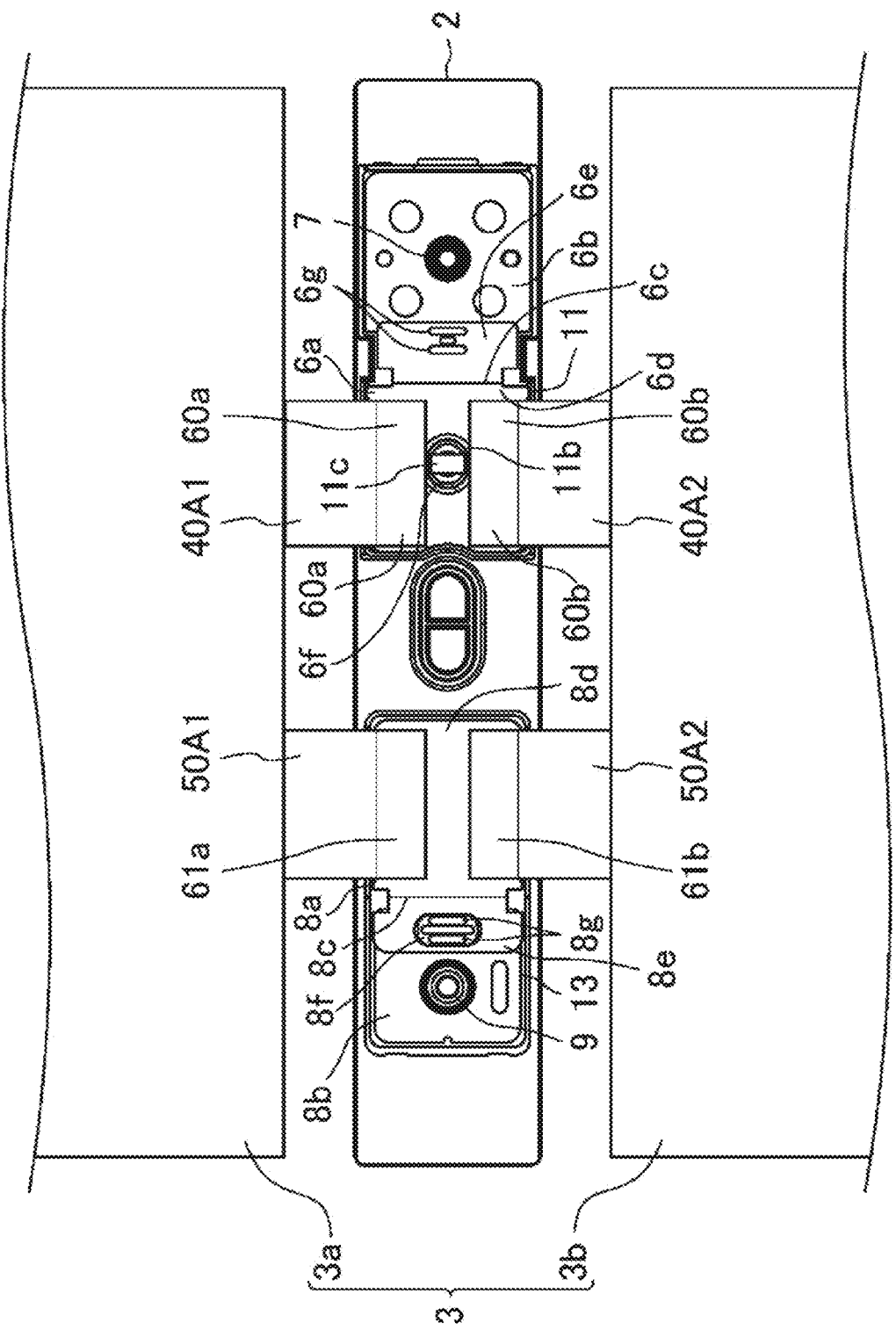
FIG. 10 shows the surface of the sealing plate facing the electrode body after attaching the first positive electrode current collector to the second positive electrode current collector, and the first negative electrode current collector to the second negative electrode current collector.

FIG. 10 shows the surface of the sealing plate 2 facing the inside of the electrode body after attaching the first positive electrode current collector 6a to the second positive electrode current collector 6b, and the first negative electrode current collector 8a to the second negative electrode current collector 8b.

The first positive electrode current collector 6a connected to the first and second positive electrode tab groups 40A1 and 40A2 is placed on the second internal insulation member 11 so that a part thereof (the electrode body-side plate 6e) overlaps the second positive electrode current collector 6b. By irradiating the thin parts 6g with laser, the first and second positive electrode current collectors 6a and 6b are welded and connected. The first negative electrode current collector 8a connected to the first and second negative electrode tab groups 50A1 and 50A2 is placed on the internal insulation member 13 so that a part thereof (the second plate 8e) overlaps the second negative electrode current collector 8b. By irradiating the thin parts 8g with laser, the first and second negative electrode current collectors 8a and 8b are welded and connected. As shown in FIG. 14, the thickness T1 of the second negative electrode current collector 8b is set larger than the sum of the step D between the first and second areas RE1 and RE2 of the first negative electrode current collector 8a and the thickness T2 of the fifth tape 85. This causes less floating of the second plate 8e of the first negative electrode current collector 8a from the second negative electrode current collector 8b. This allows more reliable welding between the first and second negative electrode current collectors 8a and 8b.

While, in this embodiment, the first and second positive electrode current collectors 6a and 6b are connected by laser welding, the connection may be made by ultrasonic welding or resistance welding, for example.

After that, as shown in FIG. 11, the first tape 81 is applied to the welding points 60a and 60b to cover the welding points 60a and 60b of the first and second positive electrode tab groups 40A1 and 40A2, and the area sandwiched between the welding points 60a and 60b on the surface of the first positive electrode current collector 6a facing the electrode body 3 from two sides in the transverse direction of the sealing plate 2. Accordingly, the first tape 81 catches the foreign objects existing around the welding points 60a and 60b, particularly the metal powder generated in a welding process of the positive electrode tab group 40A not to cause the foreign objects to enter the inside of the electrode body 3. This largely reduces the internal short circuits caused by the foreign objects.

The third tape 83 is applied to the surface of the electrode body-side plate 6e of the first positive electrode current collector 6a facing the electrode body 3 to cover the welding point between the first and second positive electrode current collectors 6a and 6b. Accordingly, the third tape 83 catches the foreign objects existing around the welding point between the first and second positive electrode current collectors 6a and 6b, particularly the metal powder generated in the welding process between the first and second positive electrode current collectors 6a and 6b not to cause the foreign objects to enter the inside of the electrode body 3. This largely reduces the internal short circuits caused by the foreign objects.

In addition, in order to cover the welding points 61a and 61b of the first and second negative electrode tab groups 50A1 and 50A2, the area sandwiched between the welding points 61a and 61b on the surface of the first negative electrode current collector 8a facing the electrode body 3 from two sides in the transverse direction of the sealing plate 2, and the welding point between the first and second negative electrode current collectors 8a and 8b, the fourth tape 84 is applied to the welding points 61a and 61b of the first and second negative electrode tab groups 50A1 and 50A2 and the area of the second plate 8e other than the recess 8f from the electrode body 3 side. Accordingly, the fourth tape 84 catches the foreign objects existing around the welding points 61a and 61b, particularly the metal powder generated in a welding process of the negative electrode tab group 50A not to cause the foreign objects to enter the inside of the electrode body 3. This largely reduces the internal short circuits caused by the foreign objects.

The fourth tape 84 covers the welding point between the first and second negative electrode current collectors 8a and 8b. This fourth tape 84 catches the foreign objects existing around the welding joint between the first and second negative electrode current collectors 8a and 8b, particularly the metal powder generated in the welding process between the first and second negative electrode current collectors 8a and 8b not to cause the foreign objects to enter the inside of the electrode body 3. This largely reduces the internal short circuits caused by the foreign objects.

Figure 12:
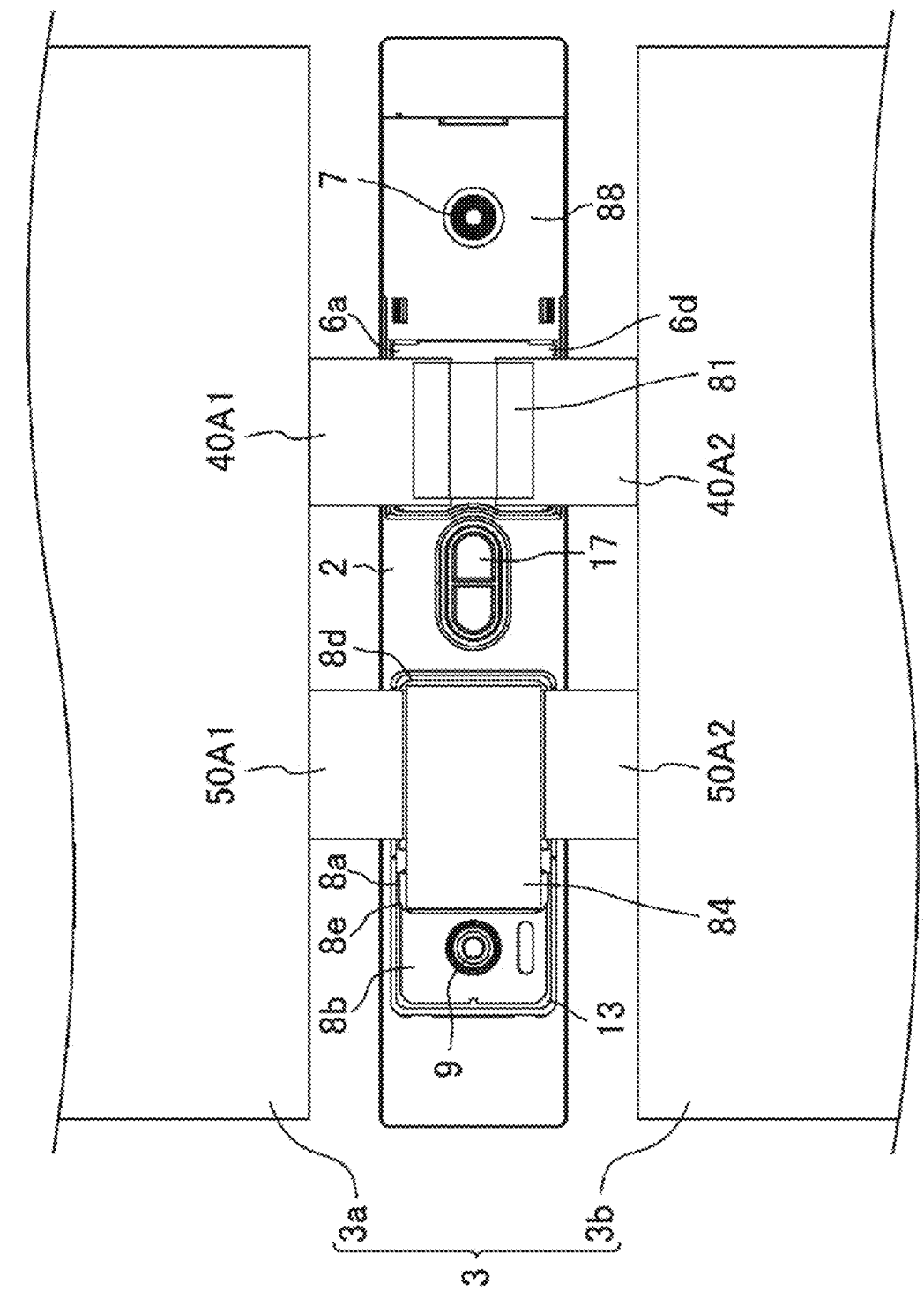
FIG. 12 corresponds to FIG. 11 with a cover member attached.

As shown in FIG. 12, the entire second positive electrode current collector 6b, the electrode body-side plate 6e of the first positive electrode current collector 6a, and the third tape 83 are then covered with a cover member 88.

In this embodiment, each of the first to fifth tapes 81 to 85 is a polypropylene film, but may be a plastic film other than the polypropylene film.

In place of the first to fifth tapes 81 to 85, each covering member may be made of a coating material such as a sealing resin that is cured by heat or light, or an adhesive sheet made of a metal foil, and a non-woven fabric, or other materials.

Each of the first to fifth tapes 81 to 85 may be replaced with a sheet or a cushion material without any adhesive layer.

[Preparation of Secondary Battery]

Next, the two positive electrode tab groups 40A1 and 40A2 and the two negative electrode tab groups 50A 1 and 50A2 are curved so that the upper surfaces of the first and second electrode body elements 3a and 3b in FIG. 12 are in direct contact or indirect contact with each other with other members interposed therebetween. Accordingly, the two electrode body elements 3a and 3b are integrated into one electrode body 3. The integrated electrode body 3 is placed in the electrode body holder 14 obtained by molding an insulating sheet into a box or a bag.

The electrode body 3 wrapped with the electrode body holder 14 is inserted into the rectangular exterior body 1. The sealing plate 2 and the rectangular exterior body 1 are welded to seal the opening of the rectangular exterior body 1 with the sealing plate 2. The electrolyte is then injected into the rectangular exterior body 1 through the electrolyte inlet 15 of the sealing plate 2. After that, the electrolyte inlet 15 is sealed with a sealing member such as a blind rivet. As a result, the rectangular secondary battery 20 is complete.

Other Embodiments

The above embodiment is a mere example of the present invention. The present invention is not limited to the example. Instead, the present invention may be a combination of a well-known art, a conventional technique, and a publicly-known technique with the example, and may also have a part of the example replaced. Moreover, the present invention includes modifications at which those skilled in the art easily arrive.

The electrode body 3 may be wound after stacking the positive electrode plate 4, the negative electrode plate 5, and the separator. Each of the electrode body elements 3a and 3b may also have a wound structure.

An example has been described above in the embodiment where the two electrode body elements 3a and 3b are arranged in the rectangular exterior body 1, but the number of the electrode body elements may be one, three, or more.

An example has been described above in the embodiment where each of the positive and negative electrode current collectors 6 and 8 includes two parts, but each of the positive and negative electrode current collectors 6 and 8 may include a single component.

In the embodiment described above, both the positive and negative electrode plates 4 and 5 have the tabs, but one of the positive and negative electrode plates 4 and 5 may have the tabs.

The positive electrode plate 4, the negative electrode plate 5, the separator, the electrolyte, and other components may be made of known materials.

DESCRIPTION OF REFERENCE CHARACTERS

1 Exterior Body
2 Sealing Plate
3 Electrode Body
4 Positive Electrode Plate
5 Negative Electrode Plate
6 Positive Electrode Current Collector
7 Positive Electrode Terminal
8 Negative Electrode Current Collector
8a First Negative Electrode Current Collector
8b Second Negative Electrode Current Collector
9 Negative Electrode Terminal
13 Internal Insulation Member
40 Positive Electrode Tab (Tab)
50 Negative Electrode Tab (Tab)
81 First Tape (Electrode Body-Side Covering Member)
82 Second Tape (Sealing Plate-Side Covering Member)
84 Fourth Tape (Electrode Body-Side Covering Member)
85 Fifth Tape (Sealing Plate-Side Covering Member)
FRE Flat Area
RE1 First Area
RE2 Second Area

The invention claimed is:

1. A battery comprising:
an electrode body obtained by stacking a positive electrode plate and a negative electrode plate with a separator interposed therebetween, the positive electrode plate including a positive electrode tab and the negative electrode plate including a negative electrode tab;
an exterior body having an opening and housing the electrode body;
a sealing plate sealing the opening;
a positive external terminal and a negative external terminal attached to the sealing plate; and
a positive current collector and a negative current collector arranged between the electrode body and the sealing plate and electrically connected to the positive external terminal and the negative external terminal, respectively, wherein:
the positive electrode tab of the electrode body is welded to a surface of the positive current collector facing the electrode body, and the negative electrode tab of the electrode body is welded to a surface of the negative current collector facing the electrode body,
the battery further comprises
a first sealing plate-side covering member covering an area corresponding to a back of a welding area of the positive electrode tab on a surface of the positive current collector facing the sealing plate; and
a second sealing plate-side covering member covering an area corresponding to a back of a welding area of the negative electrode tab on a surface of the negative current collector facing the sealing plate,
the first sealing plate-side covering member is separately provided from the second sealing plate-side covering member, and
the first sealing plate-side covering member is disposed between the sealing plate and the positive current collector, and the second sealing plate-side covering member is disposed between the sealing plate and the negative current collector.

2. The battery of claim 1, wherein
the battery further comprises an internal insulation member fixed to the sealing plate,
the internal insulation member includes a flat area on a surface facing the electrode body,
at least one of the positive current collector or the negative current collector includes a first current collector substantially in a shape of a plate and a second current collector substantially in a shape of a plate,
the first current collector includes a first area and a second area closer to the electrode body than the first area on the surface facing the sealing plate,
the second current collector is welded to the second area of the first collector,
the second current collector has a thickness set larger than a sum of a step between the first area and the second area of the first current collector and a thickness of the sealing plate- side covering member,
the first area of the first current collector is covered with a corresponding one of the first sealing plate-side covering member or the second sealing plate-side covering member, and
a surface of the second current collector facing the sealing plate abuts on the flat area of the internal insulation member, and a surface of the second current collector facing the electrode body abuts on the second area of the first current collector.

3. The battery of claim 2, wherein the first sealing plate-side covering member is disposed between the internal insulation member and the first current collector.

4. The battery of claim 1, wherein:
the battery further comprises:
a first electrode body-side covering member covering a welding point between the positive electrode tab and the positive current collector, and
a second electrode body-side covering member covering a welding point between the negative electrode tab and the negative current collector, and
the first electrode body-side covering member is disposed between the positive current collector and the electrode body, and the second electrode body-side covering member is disposed between the negative current collector and the electrode body.

5. A battery comprising:
an electrode body obtained by stacking a positive electrode plate and a negative electrode plate with a separator interposed therebetween, at least one of the positive electrode plate or the negative electrode plate including a tab;
an exterior body having an opening and housing the electrode body;
a sealing plate sealing the opening;
an external terminal attached to the sealing plate; and
a substantially plate-shaped current collector arranged substantially parallel to the sealing plate between the electrode body and the sealing plate and electrically connected to the external terminal, wherein:
the tab of the electrode body is welded to a surface of the current collector facing the electrode body,
the battery further comprises:
 a sealing plate-side covering member covering an area corresponding to a back of a welding area of the tab on a surface of the current collector facing the sealing plate, and
 an internal insulation member fixed to the sealing plate,
the internal insulation member includes a flat area on a surface facing the electrode body,
the current collector includes a first current collector and a second current collector,
the first current collector includes a first area and a second area closer to the electrode body than the first area on the surface facing the sealing plate forming a step between the first area and the second area,
the second current collector is welded to the second area of the first collector,
the second current collector has a thickness set larger than a sum of the step between the first area and the second area of the first current collector and a thickness of the sealing plate- side covering member,
the first area of the first current collector is covered with the sealing plate-side covering member,
a surface of the second current collector facing the sealing plate abuts on the flat area of the internal insulation member, whereas a surface of the second current collector facing the electrode body abuts on the second area of the first current collector, and
the first sealing plate-side covering member is disposed between the internal insulation member and the first current collector.

\* \* \* \* \*